Figure 1:
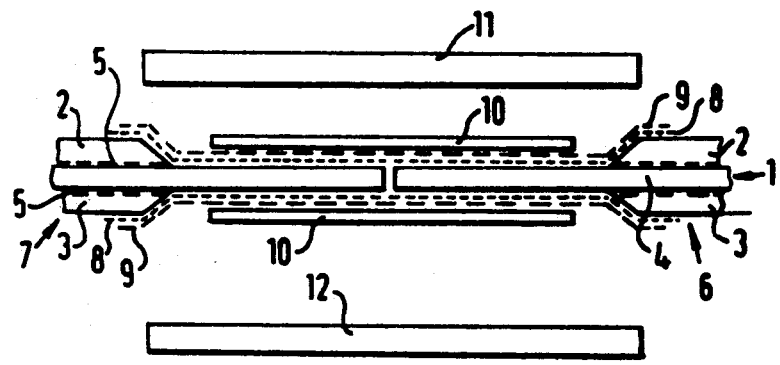

United States Patent [19]

Möring

[11] 4,050,322
[45] Sept. 27, 1977

[54] BELTING

[75] Inventor: Peter Lothar Ernst Möring, Sutton Coldfield, England

[73] Assignee: Dunlop Limited, London, England

[21] Appl. No.: 726,782

[22] Filed: Sept. 27, 1976

[30] Foreign Application Priority Data

Oct. 3, 1975 United Kingdom ............ 40500/75

[51] Int. Cl.² .................................... F16G 1/00
[52] U.S. Cl. .................................... 74/231 J
[58] Field of Search ............................ 74/231 J

[56] References Cited
U.S. PATENT DOCUMENTS 3,988,940  11/1976  Szonn .................. 74/231 J Primary Examiner—Leonard H. Gerin
Attorney, Agent, or Firm—Stevens, Davis, Miller & Mosher

[57] ABSTRACT

Belting having a layer of covering material and a compression resistant longitudinal reinforcement structure the belting being formed with a joint region at which ends of the reinforcement structure are in end-to-end relationship with a layer of jointing fabric overlying the ends of the reinforcement structure and positioned with warp members of the jointing fabric lying parallel to the length of the belting, the jointing fabric having a high tensile strength in the warp direction and sufficient crimp or twist to absorb compressive force in the warp direction.

22 Claims, 2 Drawing Figures

BELTING

This invention relates to belting and in particular to a method of joining belting which incorporates a warpwise reinforcement structure of compression resistant material.

A compression resistant material is defined herein as a material which does not include any substantial crimp or twist in the warp members to allow absorption of compression in the warp direction.

Compression resistant warp reinforcement materials can only be used when the warp reinforcement is made thin in order not excessively to stiffen the belting in the warp direction. Nevertheless such materials are useful in the belting art and an effective method of joining such belting is necessary.

Joining the reinforcement structure requires firstly a join of similar strength or rating to the belting and secondly a join of similar flexibility to the belting to avoid relatively hard or stiff regions which lead to service failure.

As with all belting, it is preferable that a join may be made outside the belting factory so that the belting may be assembled on site and damaged or worn sections of a long belt may be replaced.

One object of the present invention is to provide a method of effectively joining belting of the type described. Another object of the invention is to provide jointed belting of the type described. The invention is particularly applicable to belting of the type described in the specification of the assignee's pending U.S. Pat. application Ser. No. 665,417 filed Mar. 10, 1976 but it may be used with other belting for example plastics film reinforced belting.

According to one aspect of the present invention there is provided belting having a layer of covering material and a compression resistant longitudinal reinforcement structure as hereinbefore defined, the belting being formed with a joint region at which ends of the reinforcement structure are in end-to-end relationship with a layer of jointing fabric as hereinbefore defined overlying the ends of the reinforcement structure and positioned with warp members of the jointing fabric lying parallel to the length of the belting.

According to another aspect of the present invention a method of joining two ends of belting having a layer of cover material and a compression resistant longitudinal reinforcement structure as hereinbefore defined comprises removing the cover material from the longitudinal reinforcement structure for a short distance from each belting end, placing the ends of the uncovered reinforcement structures in end-to-end relationship, applying a layer of jointing-fabric as defined herein with the warp members parallel to the length of the belting to overlie the ends, applying covering material and setting or vulcanizing the assembly.

A "jointing-fabric" is defined as a fabric having a high tensile strength in the warp direction together with sufficient crimp or twist to absorb compressive force in the warp direction.

The jointing fabric may comprise a cross-woven belting fabric having a warp strength equal to or greater than the warp strength of the belting and sufficient crimp in the warp to absorb compressive forces. Preferably, however, the jointing fabric comprises a fabric which is substantially weftless and the warp comprises twisted singles or plied yarns. The fabric may be truely weftless or have the warp yarns embedded in a flexible matrix or be a tire cord fabric which comprises plied warp yarns held together by a light weft which is widely spaced (e.g. 8 ends per 10 cms). The tire cord fabric may in addition be coated with a flexible matrix material.

Preferably a layer of jointing-fabric is applied above and a layer of jointing-fabric is applied below the longitudinal reinforcement structure. Preferably the combined warp strength of the two jointing fabrics is equal to or greater than the warp strength of the unjoined belting.

Preferably an adhesive or an adhesion-promoter is applied to the reinforcement structure surfaces before placing the ends together and/or after placing the ends together and before applying the jointing-fabric. Furthermore a thin interlayer of elastomer may be applied to the reinforcement structure to overlap the join before applying the jointing-fabric.

In addition to absorbing compression in the direction of the length of a belt, if the layer is a cross-woven fabric, it should also contain weft crimp to be compression absorbing in the transverse direction, so that the belt can be made to adopt a trough shape in cross-section.

The ends of belting to be joined may be cut to form a finger join (i.e. interleaved projections) or may be cut straight to form a butt join. Preferably the ends are bias cut to provide a join length greater than the width of the belting and a preferred bias angle is 60° to the length of the belting.

The assembled join may be set in a portable belting press, and clamps to maintain the ends in end-to-end contact may be applied prior to closing the press. In the case of P.V.C. belting or belting having a P.V.C. matrix for the longitudinal reinforcement structure and rubber covers the press is cooled before opening.

The cover material may be removed mechanically, i.e. by cutting or the use of a hot knife, or by using heat to effect delamination. In the case of P.V.C. belting or belting having a P.V.C. matrix for the longitudinal reinforcement structure, heating between lightly clamped platens followed by opening the platens when hot allows the cover and any weft reinforcement layers to be peeled back whereupon they can be cut off to expose the longitudinal reinforcement structure for joining. Preferably the cover material and the transverse reinforcement layers are cut back at an angle to the surface of the reinforcement structure to form a bevelled edge. One preferred angle of cut-back is 45°.

Preferably the ends are in abutting contact in the form of a simple straight butt-join and the butt-join lies at an angle across the belting.

Figure 2:
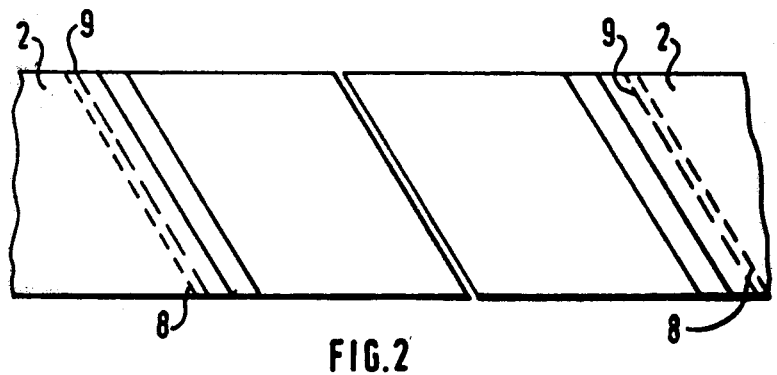

Other aspects of the invention will be apparent from the following description of a belt-joining operation by way of example only and in conjunction with the diagrammatic drawings which show in:

FIG. 1 an exploded side view of a join, and
FIG. 2 a plan view of the same join.

The belting shown comprises a reinforcement carcass 1, an upper rubber cover 2 and a lower rubber cover 3. The reinforcement carcass comprises a longitudinal reinforcement structure 4, i.e. a warp reinforcement, formed by one or more overlapping thin sheets of material each comprising a multiplicity of parallel continuous filaments of nylon closely packed together and impregnated by a P.V.C. matrix material which bonds the structure 4 together. Two similar sheets 5 of material are applied one above and one below the structure 4 with the filaments extending weftwise to provide transverse strength for the belting. The assembly of reinforcement layers and covers is fused together. A full specification of the belting is given in the specification of the assignee's pending U.S. Pat. application Ser. No. 665,417 filed Mar. 10, 1976. Thus the belting comprised an 8 mm thickness built to standard 315 KN/m specification. It comprised two longitudinal reinforcement sheets 1050 mm wide each formed by an assembly of 2853 ends of 94 tex nylon tire yarn (140 filaments per yarn) which therefore provided in total 399420 filaments of 0.67 tex in a sheet of regular end spacing which was encapsulated with P.V.C. plastisol to a level of 300% based on yarn weight. The plastisol formulation was:

Norvinyl P10 (Trade Mark of the Norsk Hydro Co.); 100
Diisoctyl phthalate; 45
Diallyl phthalate; 10
Dicumyl peroxide; 1
Tribasic lead sulphate; 5
Resorcinol; 7.5
Hexamethylene tetramine; 4.5
Triton X45 (Trade Mark of Rohm & Hass); 2

A similar transverse weft reinforcement sheet was applied to either side of the longitudinal reinforcement. This weft sheet had 951 ends of 94 tex nylon yarn (140 filaments per yarn) in each 1050 mm width. Natural rubber covers were applied to form the belting assembly.

To make the join the belting ends to be connected were cut at 60° bias angle as shown in FIG. 2. Each bias cut end was then treated by putting it into a heated press so that 97 mm of belting was heated at touch pressure to 150° C. for 15 minutes. The press was then opened and the cover layers 2 and 3 and the weft reinforcement layers 5 were peeled back from the longitudinal reinforcement structure 4. The delaminated covers 2 and 3 and weft reinforcement layers 5 were then cut off 95 mm from the end of the belting so as to leave a 2 mm delaminated lip.

A plate was positioned under the weft layers 5 in turn to prevent damage to the longitudinal reinforcement structure and the cover layers 2 and 3 and the weft layers were trimmed off at 45° to the surface of the belting as shown in FIG. 1.

The exposed warp reinforcement 4 was placed in a heated press between PTFE coated plates at 160° C. and low pressure for 5 minutes to consolidate the assembly, the press being cooled before opening.

Both sides of the warp reinforcement 4 including the 2 mm deep section under the lip of the covers 2 and 3 were coated with a layer 8 of Chemlock 220 (Trade Mark of the Hughson Chemical Co.), to a distance 15 mm beyond the bevelled edge and allowed to dry.

The two ends 6 and 7 of belting were butted together and clamps applied to maintain end-to-end contact. A 0.5 mm thick sheet of skim compound 9 (a 90/10 SBR/natural rubber compound including also usual curing agents) was applied to each side of the join equally to overlie the butt and extend about 10 mm beyond the bevelled edges of the covers 2 and 3.

A tire cord fabric comprising a warp of 2/140 tex nylon cords at 95 ends per 100 mm each cord having a twist of 370 turns per $m$ (z) (meter z direction twist) in the singles and 370 turns per $m$ (s) in the folding, and a weft of 20-21 tex spun staple yarn to provide a resultant warp strength of 200 KN $m$ was then bias cut to provide a 160 mm length which was applied over the join to provide the jointing fabric 10 with the warp members arranged parallel to the length of the belting. Uncured rubber cover material sheets 11 and 12 were then applied to make the join of the same thickness as the belting and the assembly was put in a heated portable belting press. The press conditions were 70 p.s.i. (483 KN/m$^2$) and 140° C. for 30 minutes. The join and press were allowed to cool before opening the press.

As an alternative to the simple straight butt join between the ends of the longitudinal warp reinforcement structures the ends may be notched to form a finger joint or other well-known arrangement.

One or more layers of jointing-fabric may be used and these may be above, below or both above and below the longitudinal warp reinforcement.

The interlayer of rubber may be dispensed with or alternative compatible materials such as the P.V.C. matrix material may be used.

Belting fabric having sufficient crimp to absorb compressive force on bending of the join in service may be used in place of the tire cord fabric described which absorbs compression due to the twist. Tire cord fabrics being designed for compressive forces as well as tensile forces have been found to provide flexible joins of high join efficiency and efficiencies of 80-100 percent may be achieved.

Having now described my invention what I claim is:

1. Belting having a layer of covering material and a compression resistant longitudinal reinforcement structure as hereinbefore defined, the belting being formed with a joint region at which ends of the reinforcement structure are in end-to-end relationship with a layer of jointing fabric as hereinbefore defined overlying the ends of the reinforcement structure and positioned with warp members of the jointing fabric lying parallel to the length of the belting.

2. Belting according to claim 1 in which the ends of the reinforcement structure are in end-to-end contact.

3. Belting according to claim 1 wherein the jointing fabric is a substantially weftless fabric.

4. Belting according to claim 1 wherein the warp members are embedded in a flexible matrix material.

5. Belting according to claim 1 wherein the warp members comprise singles yarns.

6. Belting according to claim 1 wherein the warp members comprise plied yarns.

7. Belting according to claim 1 wherein the jointing fabric is a tyre cord type material comprising plied warp yarns and relatively light weft yarns.

8. Belting according to claim 1 wherein the jointing fabric comprises a cross-woven belting fabric.

9. Belting according to claim 8 wherein compression forces acting on the jointing fabric are absorbed by crimp in the warp members.

10. Belting according to claim 1 wherein a layer of jointing fabric is provided at each side of the longitudinal reinforcement structure.

11. Belting according to claim 10 wherein the combined strength of the two layers of jointing fabric is no less than the strength of the unjoined belting in the direction of the length of the belting.

12. Belting according to claim 1 wherein an interlayer of elastomer is provided between the reinforcement structure and at least one layer of jointing fabric.

13. Belting according to claim 1 wherein the join is a butt joint lying at an angle across the width of the belting.

14. A method of joining two ends of belting having a layer of cover material and a compression resistant longitudinal reinforcement structure as hereinbefore defined comprising removing the cover layer from the longitudinal reinforcement structure for a short distance from each belting end, placing the uncovered reinforcement structure ends in end-to-end relationship, applying a layer of jointing fabric as hereinbefore defined with the warp members parallel to the length of the belting to overlie the ends, applying covering material and setting and vulcanizing the assembly.

15. A method according to claim 14 wherein ends of the reinforcement structure are placed in end-to-end contact.

16. A method according to claim 14 wherein adhesive is applied to the reinforcement structure before the application of the jointing fabric.

17. A method according to claim 14 wherein an adhesion promoter is applied to the reinforcement structure surfaces before applying the jointing fabric.

18. A method according to claim 14 wherein the interlayer of elastomer is applied to the reinforcement structure before application of the jointing fabric.

19. A method according to claim 14 wherein the assembled join is set in a portable belting press.

20. A method according to claim 19 wherein the press is cooled before opening.

21. A method according to claim 14 wherein cover material is removed from the reinforcement structure by heating the belting to effect delamination of the cover material layer.

22. Belting joined by a method according to claim 14.